Aug. 8, 1967     J. P. ARMSTRONG     3,334,536
RELEASABLE NUT WITH RADIAL AND LONGITUDINAL LOCKOUT
Filed March 23, 1964
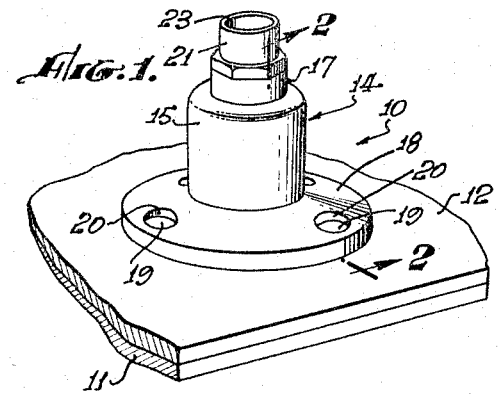
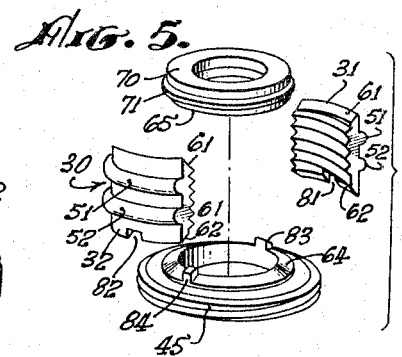
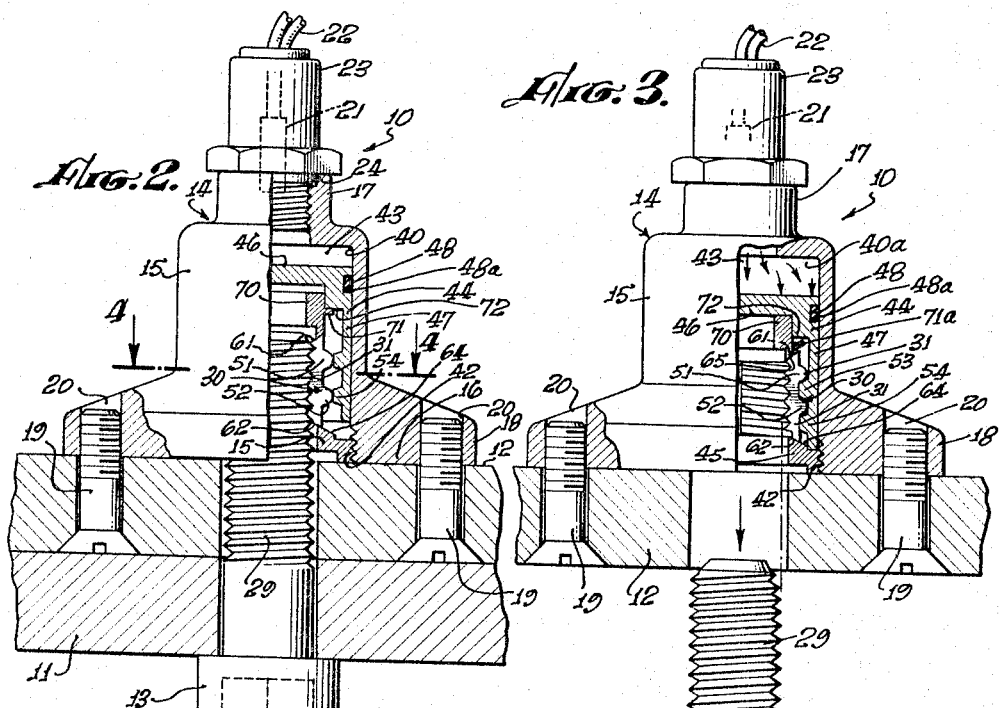
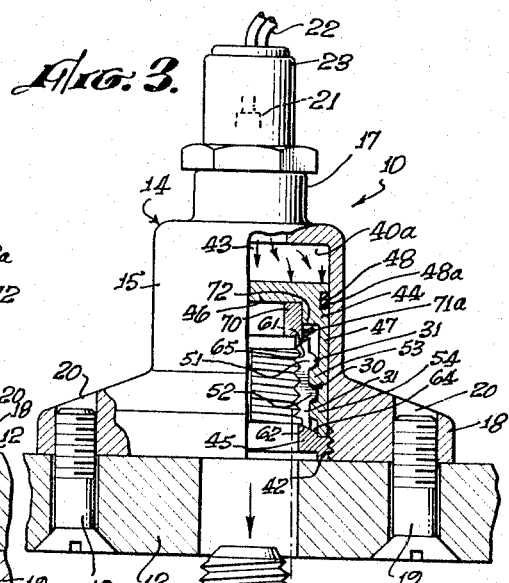
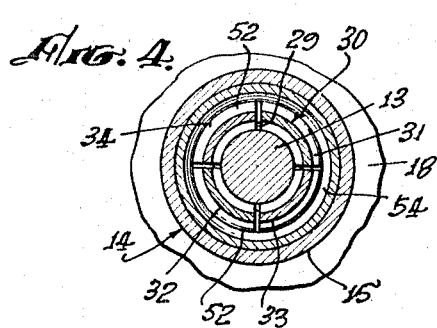
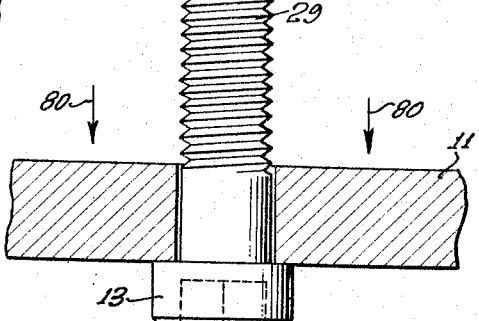
JOHN P. ARMSTRONG,
INVENTOR.
BY Edmond F. Shanahan
ATTORNEY.

United States Patent Office 3,334,536
Patented Aug. 8, 1967

3,334,536
RELEASABLE NUT WITH RADIAL AND LONGITUDINAL LOCKOUT
John P. Armstrong, San Fernando, Calif., assignor to Bermite Powder Company, North Hollywood, Calif., a corporation of California
Filed Mar. 23, 1964, Ser. No. 354,074
7 Claims. (Cl. 85—33)

This invention relates to releasable nuts, such as explosive nuts in which a set of threaded segments are driven out of engagement with a bolt by a device actuated by squib-produced gases. More particularly, this invention relates to a releasable nut in which the segments are released and locked out of engagement with the bolt threads in a two-step sequence: first, radial release by longitudinal displacement of an enclosing sleeve structure, and second, by positive outward displacement and lockout by a telescoping cone structure of novel construction.

In a preferred form of the invention, actuation is achieved by an entirely enclosed explosion, and the features of releasability and lockout also act to prevent the escape of explosion gases.

The use of explosion nuts and explosion bolts have experienced vastly increased application in recent years because of their convenience for use in many applications in space technology. For example, upon a signal from the earth or from within the device itself, an orbiting space device can impart electrical ignition to explosive squibs within such nuts, so as to detach an exhausted launching vehicle from the orbiting payload. Astronauts have made quick escapes from a satellite pod, after return to the earth's surface, by exploding bolts or nuts to release a hatch cover. In addition to these widely known applications, variations of the explosive nut or bolt are beginning to be proposed for application in submarine devices, or for devices to be used in environments of high radioactivity.

One of the major objects of the present invention is to vastly increase the possible applications of explosion nuts, and to eliminate many of the objectionable features heretofore associated with them. Thus, the explosion nut of this invention could be used in connection with fire escapes, shipboard hatches, safety devices on construction cranes or high speed rotating machinery.

The term, "explosive nut," should not be taken as limiting the utility of the invention to devices in which actuating pressure is obtained by the gases generated by the burning of a squib, although it will be appreciated, but this is by far the preferred form in most applications. However, in its most generic form, the invention may be used with means of pressure actuation other than by explosion gases.

In a typical explosive nut application, the entire explosion nut device is housed in a body which is screwed or bolted to the surface of a plate or wall comprising part of one member to be separated. However, in some applications, it is not necessary that the explosive nut be held on said member by anything except the bolt which it is adapted to receive. In either case, the member upon which the nut is carried will be designated for purposes of identification as the nut-held part.

A second part, which may be referred to for purposes of identification as the bolt-head part, is typically a second plate or wall mating with the nut-held part, both parts having mating holes for the passage of the threaded shank of the bolt to mating threads inside the explosion nut. However, the invention is not limited in any way as to the shape of the two mating parts, or the bolt-head, or the holes or other means of reception by which the two parts are held in attachment by the bolt and the explosive nut.

Many of the explosion nuts heretofore known, and still in use, are reliable in actuation only if they are massively constructed. If an attempt is made to reduce them in size, actuation becomes unreliable unless the explosive charge is large enough to destroy the nut or tear it loose from the nut-held part in a large percentage of its operations. It is not merely the disadvantage of such devices that they are destroyed in being used and cannot be reused by merely threading in a new squib; they are dangerous to persons who may be within the vicinity of the nut at the time of the explosion, for example, the astronaut himself. Also, in applications on unmanned satellites and the like, valuable instrumentation, in the vicinity of the explosive nut may be damaged by fragments, or by the nut itself.

It is not only flying fragments from explosive nuts that cause undesirable effects on other devices nearby. For example, many satellites rely upon solar cells for a continuing source of power. Many of the lightweight explosive nuts heretofore known have discharged their explosion gases, at the time of the explosion, in the vicinity of the nut. Particles in these gases have then coated the solar cells, and greatly reduce their capacity for energy generation.

In general, explosive nuts and bolts rely upon a segmented thread system, which becomes releasable upon explosion. Thus, in the present invention, a set of internally threaded segments form a sleeve enclosing and mating with the threads of the bolt. It is much preferred that four quarter segments be used, but the invention in its most generic form might be used with fewer than four segments, or with more than four segments. When only two or three segments are used, the segments must be moved a greater distance in order to insure release, and this is usually a disadvantage. It is rare that any advantage is gained by using more than four segments. Regardless of the number of segments, most explosive nut designs heretofore known have been susceptible to failure because of lack of certain control over the disengaging movement of the segments, and their sure lockout in a disengaged position. There has always been the danger of a certain percentage of failures from an erratic movement on the part of one or more segments, or the tendency of one segment to bounce back into engagement with the escaping bolt, jamming it and preventing its full release.

Previous designs have attempted to overcome the foregoing objection by insuring lockout, and it has generally been by means which deform the threaded segments, or some other part of the explosive nut, so that these parts are not reusable.

The design of an explosive nut system always presents the question as to whether or not it is desired to forcibly expel the bolt, or merely to release it. Both methods of operation have their proper applications. Most previously known explosive nut designs have been suitable only for one or the other.

Another problem with previously known explosive nut designs has been that of rigidity, reliability, and structural strength prior to explosion.

The present invention meets and overcomes all the above objections, by providing a design which can be made extremely light in weight, can be reliably actuated by small squibs, can wholly contain the actuating explosion, and yet can be varied in design to fit almost any explosive nut application.

In the device of the present invention, the threaded segments are precisely controlled in their movements by a system of telescoping conical surfaces. Such an arrangement has not, in the past, seemed consistent with a structure which would be reliably bolted prior to release. In the present invention, however, the segments are so housed within a hollow actuating piston that they form a structurally rigid system with the telescoping conical system, but, upon actuation, are able to move radially from a thread-engaging position to a position in which the segments nest with the structure of the interior of the piston.

The foregoing type of operation is achieved by a release system which operates in a two-step sequence, although even more steps can be added in more complex systems. The conical telescoping system is not acted upon until there has been sufficient longitudinal actuation to permit the segments to be moved outward into nesting position by this telescoping action. After said initial longitudinal actuation, and only after it, does the telescoping action begin.

As a result of the novel structure outlined in a general way in these introductory paragraphs, the invention achieves the following and other objects and advantages.

The device may be constructed as either reusable or not reusable. Where economy or some such consideration may dictate, it can be made so that the segments are deformed in the process of being both radially outward and locked out. On the other hand, if a reusable device is desired, a few changes in the design, obvious to those skilled in the art of strength of materials, makes it possible to design segments which are moved outwardly into a nesting position without any deformation. Of course, careful control over the charge employed in the explosive squib must be exercised.

The present invention is not concerned with the particular types of propulsive charges, burning initiation charges, electrical ignition means, electrical bridge wires, hermetic sealing, or the like, which may be employed, although the present development of the explosive nut art provides the designer with almost any set of characteristics he may desire, and the limits are mostly upon the abilities of the mechanical design which he produces.

In the present design, any choice of a variety of squibs may be threadably mounted in the pressure end of the body of the device.

In the device of the present invention, an explosion presenting a peak pressure of 2500 lbs. or more may be readily contained. The amount of explosion gases required for actuation are so small that complete actuation can be achieved by only a short movement of the actuation piston within the cylindrical chamber of the explosive nut body. In a typical space application, for example, these gates are extremely hot at the moment of actuation; however, in the low temperatures of outer space, they quickly cool down and the escape pressure rapidly falls off. It may be that sealing is not absolutely perfect; however, the amount of gas which escapes at the moment of peak pressure is extremely trivial, and as cooling takes place, the pressure falls and an equilibrium condition is reached without any gas discharge sufficient to damage solar cells in the vicinity. Or, if the explosion takes place inside of a sealed cabin, very little of the explosion gases leak out to contaminate the air therein.

The foregoing and other features of the invention, and its general and preferred form of construction may be best understood from the following description of one specific embodiment.

The described embodiment is illustrated in the accompanying drawings, in which:

FIGURE 1 is a perspective view of fragments of a nut-held part attached to the upper surface of a bolt-held part, the explosive nut being seen from the exterior, mounted on said nut-held part by screws;

FIGURE 2 is a partial section taken through the explosive nut and the bolted structure at the longitudinal axial plane indicated by the arrows 2—2 in FIGURE 1;

FIGURE 3 is the same view as FIGURE 2, but as seen after explosion and release has occurred;

FIGURE 4 is a sectional view transverse to the axis of the bolt and nut system, taken at the transverse plane indicated in FIGURE 2 by the arrows 4—4; and, FIGURE 5 is a perspective view of the conical telescoping system, only two segments out of four being shown, in order to make the illustration more revealing.

In FIGURE 1, a bolted structure indicated generally by the numeral 10 is seen to be comprised of a lower plate or bolt-head part 11 surmounted by an upper plate or nut-held part 12, which are attached to one another by means of an ordinary socket head bolt 13 (see FIGURES 2 and 3), which sets into an explosive nut 14.

The explosive nut 14 has housed within its principal part a body 15 which may be considered as having an axis in its structure co-axial with the bolt 13 and extending from a release end 16 (see FIGURE 2) to a pressure end 17.

As already mentioned, it is usually desired to mount the explosive nut 14 permanently on the nut-held part 12, usually by a mounting flange 18 held in position by screws 19 received in threaded bores 20.

The outer or upstream end of the housing 14 which has been designated herein as pressure end 17 is designed to accommodate a suitable pressure source, such as the explosive squib 21, which would ordinarily be electrically actuated by wires 22, connecting to foot receptacle 23. Inside the squib means 21, the charge is hermetically sealed, by solder, or by other suitable sealing means, for protection against moisture, etc. Also, if desired, the squib may be encircled by a squib O ring 24, seen in section in FIGURE 2, for resisting escape of explosion gases from within the housing 15 by way of space around the squib 21.

The sectional views of FIGURES 2 and 3, taken in connection with transverse sectional view of FIGURE 4, and the perspective view of FIGURE 5, reveal that the bolt threads 29 are engaged by an internally threaded sleeve identified generally by the numeral 30, but seen to be comprised of four quarter segments 31, 32, 33, and 34, only segments 31 and 32 being shown in the perspective view of FIGURE 5.

The interior of the body 15 is seen, in FIGURES 2 and 3, to provide a cylindrical chamber 40, which is co-axial with bolt 13, of substantially larger diameter than bolt 13, and extends from a bolt receiving opening 42 at the release end, to an enclosed pressure chamber 43 at the pressure end.

A piston 44 is reciprocable within the cylinder 40 between an upstream bolted position in which pressure chamber 40 is relatively small, as seen in FIGURE 2, to a downstream release position in which the pressure chamber volume has increased as indicated by 40a in FIGURE 3.

A locking ring 45 is threadably received in the release end 42 of the cylinder 40, and serves several purposes to be described hereinafter, but including limiting the release movement of piston 44 as indicated in FIGURE 3. It will be noted that piston 44 is comprised of a pressure end 46 with a downwardly depending sleeve 47, within which the building and release conditions are established. Also, piston 44 is preferably provided with sealing means such as an O ring 48 housed in exterior annular groove 48a.

It will be seen from the sectional view of FIGURE 2 that the threaded segment assembly 30 is held into engagement with the bolt threads 29 by mating abutting structures on the exterior walls of the segments 31 to 34, and the interior walls of sleeve 47. In this particular embodiment, this structure is comprised of a pair of annular external shoulders 51 and 52 on the threaded segment assembly 30, and a mating pair of internal annular shoulders 53 tnd 54 in the interior wall of piston sleeve 47.

However, it will be appreciated that variations in this abutting structure can be used, so long as it is capable of holding the system in firm bolted engagement as seen in FIGURE 2, while converting to a nested released position as seen in FIGURE 3, when sufficient longitudinal movement of piston 44 relative to threaded segment assembly 30 takes place.

However, it will also be seen that the longitudinal movement which takes place between FIGURE 2 and FIGURE 3 merely makes possible, but not certain, the radially outward movement necessary to achieve the nesting position of FIGURE 3, except for the fact that there is provided in the device of the invention the conical telescoping system which positively achieves said outward movement to nesting position.

It will be seen from the perspective view of FIGURE 5 that the segments 31 to 34 are outwardly flared at each end to provide pressure in the conical surfaces 61 and release end conical surfaces 62, respectively. Correspondingly, the upstream or pressure side of the ring 45 is provided with a mating converging conical surface 64.

An opposing and opposite mating conical surface 65 is provided at the pressure end of segment assembly 30 by a ring 70 which may be identified as the timing ring since it controls the timing of the sequence of steps of release, in the preferred embodiment shown, and described hereinafter.

It will be seen that timing ring 70 is provided with an external annular shear flange 71, as seen in FIGURE 2, the shear flange 71 seats under a shearing shoulder or step 72 formed in the pressure end of the interior of piston 44. Accidental release of the bolt 13 is thus avoided, as the piston 44 cannot move downward to the released position of FIGURE 3 until it has been subjected to sufficient pressure and pressure chamber 40 to shear away the external shear flange 71 as seen in 71a in FIGURE 3.

Moreover, it is important to note that the pressure in 43 is spaced longitudinally downstream toward the release end 16 from contact with the pressure end 46 of piston 44. This provides for the timing of the first step in the sequence of release. It is necessary for piston 44 to travel this space distance shearing flange 71, and displacing the mating annular shoulders 53 and 54 below the annular shoulders 51 and 52 to permit the nesting seen in FIGURE 3. Only after this initial longitudinal displacement occurs, can the next step in the sequence of release take place.

The second sequence in release of the bolt 14 is the radially outward displacement of the segments 31 to 34 from the bottom position of FIGURE 2 to the release position of FIGURE 3 by the telescoping action of timing ring 70 downward towards locking ring 45. The cam movement between the mating of conical surfaces at each end of the threaded segment assembly 30, as illustrated in FIGURE 5, converts this telescoping action to positive outward radial movement, and once telescoping has occurred, the retention of pressure in chamber 40a, by virtue of its secure sealing, holds the lockout condition of FIGURE 3 for a perceptible time, much more than is required to release bolt 13.

It is optional as to whether or not bolt 13 will be forcibly expelled in the direction of the arrows 80, as indicated in FIGURE 3, by a blow from the understructure of timing ring 70, or piston 44, or whether no such blow will be employed, but only release of threaded segment assembly 30.

It will be understood that it is much preferred to design the device to avoid any deformation so as to make it reusable, and to avoid any possible jamming. However, the segments 31 may be driven to deformation (in the position of FIGURE 3) if a particular application makes that desirable.

An important role of locking ring 45 is to provide some method of keying so that the bolt 13 may be tightened into the segment assembly 30 with good torquing force. In the specific embodiment illustrated, two opposite segments 31 and 32 are provided with longitudinal keyways 81 and 82 at the lower or release ends. Upstanding longitudinal keys 83 and 84 on locking ring 45 mate with these keyways and lock the segmented assembly against rotation.

It will be seen from the illustrations of FIGURES 2 and 3 that in the preferred specific embodiment the nesting structure of the annular shoulders 51 and 52 with 53 and 54 serves the additional purpose of imparting a positive downward movement to the threaded segment assembly 30 during the last part, and the last part only, of the releasing movement of piston 44.

While the foregoing description has set forth in great detail one specific embodiment comprising substantially all of the best features of the invention, it will be understood that the invention in its most generic form may embody in a great variety of structures which depart materially from the particular forms and operations illustrated. It is therefore my intention to include all such variations in design which are comprehended within the scope of the following claims.

Having thus described my invention, what I claim as new and desire to secure by Letters Patent is:

1. A releasable nut device for releasably holding in assembly a bolted structure comprised of a bolt-head part, a nut-held part, and a bolt for holding said parts in assembly, which device comprises:

a body having an internal chamber aligned with said bolt, said chamber extending longitudinally from a release end having an opening for the reception of the threaded shank of said bolt, to a pressure end enclosing a pressure chamber, and having a location for the admission of fluid under pressure;

a set of internally threaded segments forming, in assembly, a threaded sleeve mating with the threads of said bolt, said sleeve assembly having surfaces at at least one end, which diverge from the axis of said assembly;

a piston closely received in said chamber and reciprocable between a bolt-engaging position near the pressure end of said cylindrical chamber and a bolt-releasing position near the release end of said chamber, said piston being comprised of a pressure head at the pressure end and a depending sleeve opening toward the release end, said sleeve enclosing said segment assembly;

a converging surface structure mating with the diverging surfaces of said segments;

a nestable structure between said threaded segment assembly and the interior of said piston sleeve including an annular shoulder on one of said parts mating with an adjacent annular groove on the other, said nested structure being held in an abutting position with said segments in engagement with the threads of said bolt, as long as said piston remains in said bolt-engaging position in the pressure end of said chamber, but being adapted to nest radially outward from longitudinal movement of said piston toward said release position;

and means for discharging propulsion fluid into said pressure chamber within the pressure end of said cylindrical chamber.

2. An explosive nut device for releasably holding in assembly a bolted structure comprised of a bolt-head part, a nut-held part, and a bolt for holding said parts in assembly, which device comprises:

a body having an internal cylindrical chamber axially aligned with said bolt, said chamber extending longitudinally from a release end having an opening for the reception of the threaded shank of said bolt, to a pressure end enclosing a pressure chamber, and having a location for the admission of fluid under pressure;

a set of internally threaded segments forming, in assembly, a threaded sleeve mating with the threads of said bolt, said sleeve assembly having surfaces at each end, which diverge from the axis of said assembly;

a piston closely received in said chamber and reciprocable between a bolt-engaging position near the pressure end of said cylindrical chamber and a bolt-releasing position near the release end of said chamber, said piston being comprised of a pressure head at the pressure end and a depending sleeve opening toward the release end, said sleeve enclosing said segment assembly with an annular space between the exterior of said segments and the interior of said sleeve;

means engaging said segment assembly to lock it against rotation within said body;

a converging surface structure mating with the release end of said segments;

timing ring means enclosed within said piston sleeve between said pressure head and said threaded segment assembly, said timing ring having a converging surface mating with and bearing on said pressure end of said threaded segment assembly, said timing ring means being spaced longitudinally away from the interior of said pressure head of said piston toward the release end of said body to permit an initial stage of releasing movement by said piston before the interior of said pressure head makes driving engagement with the pressure end of said timing ring means;

an annular shear flange on the exterior of said timing ring means;

a flange-shearing structure on the interior of said piston adapted to shear said flange from said timing ring;

a nestable structure in said annular space between said threaded segment assembly and the interior of said piston sleeve including an annular shoulder on one of said parts mating with an adjacent annular groove on the other, said nested structure being held in an abutting position with said segments in engagement with the threads of said bolt, as long as said piston remains in said bolt-engaging position in the pressure end of said chamber, but being adapted to nest radially outward upon longitudinal movement of said piston toward said release position;

and means for discharging propulsion fluid into said pressure chamber within the pressure end of said cylindrical chamber, and drive said piston toward said release end, shearing said shear flange from said timing ring means, and in sequence, displacing said annular nesting structure from unnested to nested position, and release end telescoping said timing ring towards said locking ring to produce radial bolt-releasing movement of said segments.

3. An explosive nut device for releasably holding in assembly, a bolted structure comprised of a bolt-head part, a nut-held part, and a bolt for holding said parts in assembly, which device comprises:

a body having an internal cylindrical chamber axially aligned with said bolt, said chamber extending longitudinally from a release end having an opening for the reception of the threaded shank of said bolt, to a pressure end enclosing a pressure chamber, and having a location for an explosive squib means;

a set of internally threaded segments forming, in assembly, a threaded sleeve mating with the threads of said bolt, said sleeve assembly having outwardly flaring conical surfaces at each end;

a piston closely received in said chamber and reciprocable between a bolt-engaging position near the pressure end of said cylindrical chamber and a bolt-releasing position near the release end of said chamber, said piston being comprised of a pressure head at the pressure end and a depending sleeve opening toward the release end, said sleeve enclosing said segment assembly with an annular space between the exterior of said segments and the interior of said sleeve;

a locking ring structure immovably mounted in the release end opening of said body, said locking ring structure being formed toward the pressure end of said body with a conical surface mating with the release end conical surface of said segment assembly, and said locking ring structure being provided with means engaging said segment assembly to lock it against rotation within said body;

timing ring means enclosed within said piston sleeve between said pressure head and said threaded segment assembly, said timing ring having a converging conical surface mating with and bearing on said pressure end of said threaded segment assembly, said timing ring means being spaced longitudinally away from the interior of said pressure head of said piston toward the release end of said body to permit an initial stage of releasing movement by said piston before the interior of said pressure head makes driving engagement with the pressure end of said timing ring means;

an annular shear flange on the exterior of said timing ring means;

a flange-shearing structure on the interior of said piston adapted to shear said flange from said timing ring;

a nestable structure in said annular space between said threaded segment assembly and the interior of said piston sleeve including a pair of inwardly projecting annular shoulders on the interior wall of said piston sleeve and a pair of outwardly projecting annular shoulders on the exterior of said threaded assembly, said nested structure being held in an abutting position with said segments in engagement with the threads of said bolt, as long as said piston remains in said bolt-engaging position in the pressure end of said chamber, but being adapted to nest radially outward upon longitudinal movement of said piston toward said release position;

and squib means for discharging propulsion gases into said pressure chamber within the pressure end of said cylindrical chamber, and drive said piston toward said release end, shearing said shear flange from said timing ring means, and in sequence, displacing said annular nesting structure from unnested to nested position, and telescoping said timing ring towards said locking ring to produce radial bolt-releasing movement of said segments.

4. An explosive nut device for releasably holding in assembly a bolted structure comprised of a bolt-head part, a nut-held part, and a bolt for holding said parts in assembly, which device comprises:

a body having an internal cylindrical chamber axially aligned with said bolt, said chamber extending longitudinally from a release end having an opening for the reception of the threaded shank of said bolt, to a pressure end enclosing a pressure chamber, and having a mounting location for an explosive squib means;

a set of internally threaded segments forming, in assembly, a threaded sleeve mating with the threads of said bolt, said sleeve assembly having outwardly flaring conical surfaces at each end;

a piston closely received in said chamber and reciprocable between a bolt-engaging position near the pressure end of said cylindrical chamber and a bolt-releasing position near the release end of said chamber, said piston being comprised of a pressure head at the pressure end and a depending sleeve opening toward the release end, said sleeve enclosing said segment assembly with an annular space between the exterior of said segments and the interior of said sleeve;

a locking ring structure immovably mounted in the release end opening of said body, said locking ring structure being formed toward the pressure end of said body with a conical surface mating with the release end conical surface of said segment assembly, and said locking ring structure being provided with means engaging said segment assembly to lock it against rotation within said body;

timing ring means enclosed within said piston sleeve between said pressure head and said threaded segment assembly, said timing ring having a converging conical surface mating with and bearing on said pressure end of said threaded segment assembly, said timing ring means being spaced longitudinally away from the interior of said pressure head of said piston toward the release end of said body to permit an initial stage of releasing movement by said piston before the interior of said pressure head makes driving engagement with the pressure end of said timing ring means;

a pair of inwardly projecting annular shoulders on the interior wall of said piston sleeve;

a pair of outwardly projecting annular shoulders on the exterior of said threaded assembly, said segment shoulders mating with said sleeve shoulders, and adapted to be held in an abutting position with said threaded segments engaged with said bolt threads, when said piston is in the bolt-engaging position in the pressure end of said cylinder, and adapted to move outwardly in nesting engagement with each other upon movement of said piston toward said release position;

and squib means for discharging propulsion gases into the pressure end of said cylindrical chamber.

5. An explosive nut device for releasably holding in assembly a bolted structure comprised of a bolt-head part, a nut-held part, and a bolt for holding said parts in assembly, which device comprises:

a body having an internal cylindrical chamber axially aligned with said bolt, said chamber extending longitudinally from a release end having an opening for the reception of the threaded shank of said bolt, to a pressure end enclosing a pressure chamber, and having a mounting location for an explosive squib means;

a set of internally threaded segments forming, in assembly, a threaded sleeve mating with the threads of said bolt, said sleeve assembly having outwardly flaring conical surfaces at each end;

a piston closely received in said chamber and reciprocable between a bolt-engaging position near the pressure end of said cylindrical chamber and a bolt-releasing position near the release end of said chamber, said piston being comprised of a pressure head at the pressure end and a depending sleeve opening toward the release end, said sleeve enclosing said segment assembly with an annular space between the exterior of said segments and the interior of said sleeve;

a locking ring structure immovably mounted in the release end opening of said body, said locking ring structure being formed toward the pressure end of said body with a conical surface mating with the release end conical surface of said segment assembly, and said locking ring structure being provided with means engaging said segment assembly to lock it against rotation within said body;

timing ring means enclosed within said piston sleeve between said pressure head and said threaded segment assembly, said timing ring having a converging conical surface mating with and bearing on said pressure end of said threaded segment assembly, said timing ring means being spaced longitudinally away from the interior of said pressure head of said piston toward the release end of said body to permit an initial stage of releasing movement by said piston before the interior of said pressure head makes driving engagement with the pressure end of said timing ring means;

an annular shear flange on the exterior of said timing ring means;

a flange-shearing structure on the interior of said piston adapted to shear said flange from said timing ring;

a pair of inwardly projecting annular shoulders on the interior wall of said piston sleeve;

a pair of outwardly projecting annular shoulders on the exterior of said threaded assembly, said segment shoulders mating with said sleeve shoulders, and adapted to be held in an abutting position with said threaded segments engaged with said bolt threads, when said piston is in the bolt-engaging position in the pressure end of said cylindrical chamber, and adapted to move outwardly in nesting engagement with each other upon movement of said piston toward said release position, and to impart longitudinal movement to said segments toward release position during the latter part of said piston movement;

and squib means for discharging propulsion gases into the pressure end of said cylindrical chamber, and drive said piston toward said release end, shearing said shear flange from said timing ring means, and displacing said annular nesting shoulders from unnested to nested position, and telescoping said timing ring towards said locking ring to produce radial bolt-releasing movement of said segments.

6. A combination as described in claim 5 in which said squib is removable and propulsion gases are confined to said chamber after release of said bolt by stationary seal means encircling said removable squib and moving seal means encircling said piston.

7. An explosive nut device for releasably holding in assembly a bolted structure comprised of a bolt-head part, a nut-held part, and a bolt for holding said parts in assembly, which device comprises:

a body bearing on said nut held part and having an internal cylindrical chamber axially aligned with said bolt, said chamber extending longitudinally from a release end having an opening for the reception of the threaded shank of said bolt, to a pressure end enclosing a pressure chamber, and having a mounting location for an explosive squib means;

a set of internally threaded segments forming, in assembly, a threaded sleeve mating with the threads of said bolt, said sleeve assembly having outwardly flaring conical surfaces at each end;

a piston closely received in said chamber and reciprocable between a bolt-engaging position near the pressure end of said cylindrical chamber and a bolt-releasing position near the release end of said chamber, said piston being comprised of a pressure head at the pressure end and a depending sleeve opening toward the release end, said sleeve enclosing said segment assembly with an annular space between the exterior of said segments and the interior of said sleeve;

a locking ring structure threadably received in the release end opening of said body, said locking ring structure being formed toward the pressure end of said body with a conical surface mating with the release end conical surface of said segment assembly, and said locking ring structure being provided with upstanding keys engaging keyways in said segment assembly to lock it against rotation within said body;

timing ring means enclosed within said piston sleeve between said pressure head and said threaded segment assembly, said timing ring having a converging conical surface mating with and bearing on said pressure end of said threaded segment assembly, said timing ring means being spaced longitudinally away from the interior of said pressure head of said piston toward the release end of said body to permit an initial stage of releasing movement by said piston before the interior of said pressure head makes driving engagement with the pressure end of said timing ring means;

an annular shear flange on the exterior of said timing ring means;

a flange-shearing structure on the interior of said piston adapted to shear said flange from said timing ring immediately upon the beginning of said release movement;

a pair of inwardly projecting annular shoulders on the interior wall of said piston sleeve;

a pair of outwardly projecting annular shoulders on the exterior of said threaded assembly, said segment shoulders mating with said sleeve shoulders, and adapted to be held in an abutting position with said threaded segments engaged with said bolt threads, when said piston is in the bolt-engaging position in the pressure end of said cylindrical chamber, and adapted to move outwardly in nesting engagement with each other upon movement of said cylinder toward said release position;

and squib means for discharging propulsion gases into the pressure end of said cylindrical chamber, and drive said piston toward said release end, and in sequence, first shearing said shear flange from said timing ring means, and displacing said annular nesting shoulders from unnested to nested position, and then telescoping said timing ring towards said locking ring to produce radial bolt-releasing movement of said segments.

References Cited

UNITED STATES PATENTS

| | | | |
|---|---|---|---|
| 1,909,601 | 5/1933 | Young et al. | 85—33 |
| 2,737,248 | 3/1956 | Baker | 285—34 |
| 3,053,131 | 9/1962 | Stott | 85—33 |
| 3,169,786 | 2/1965 | Cator | 285—3 |

CARL W. TOMLIN, *Primary Examiner.*

R. S. BRITTS, *Assistant Examiner.*